(12) United States Patent
Haiplik et al.

(10) Patent No.: US 7,702,943 B2
(45) Date of Patent: Apr. 20, 2010

(54) REAL TIME CLOCK

(75) Inventors: Holger Haiplik, Swindon (GB); Clive Robert Graham, Edinburgh (GB)

(73) Assignee: Wolfson Microelectronics plc, Edinburgh (GB)

( * ) Notice: Subject to any disclaimer, the term of this patent is extended or adjusted under 35 U.S.C. 154(b) by 41 days.

(21) Appl. No.: 12/117,421

(22) Filed: May 8, 2008

(65) Prior Publication Data

US 2009/0238323 A1  Sep. 24, 2009

(30) Foreign Application Priority Data

Mar. 20, 2008  (GB) ................. 0805316.7

(51) Int. Cl.
  *G06F 1/04* (2006.01)
(52) U.S. Cl. ...................... 713/500; 713/502
(58) Field of Classification Search ........ None
See application file for complete search history.

(56) References Cited

U.S. PATENT DOCUMENTS

| 6,772,361 | B1 | 8/2004 | Walsh |
| 2002/0147935 | A1 | 10/2002 | Miyake |
| 2004/0128549 | A1 | 7/2004 | Poisner |
| 2007/0074044 | A1 | 3/2007 | Brickell et al. |
| 2008/0276298 | A1* | 11/2008 | Leterrier et al. ............ 726/2 |

FOREIGN PATENT DOCUMENTS

| EP | 0 965 902 A2 | 12/1999 |
| EP | 1 376 306 A2 | 1/2004 |
| JP | 2006-201856 A | 8/2006 |
| JP | 2006-222515 A | 8/2006 |

OTHER PUBLICATIONS

"Secured Compact Flash which Includes Clock", Research Disclosure, Mason Publications, Hampshire, GB, No. 420, Apr. 1, 1999, p. 564.

\* cited by examiner

*Primary Examiner*—An T Luu
(74) *Attorney, Agent, or Firm*—Dickstein Shapiro LLP

(57) ABSTRACT

A real time clock comprises a counter which stores a count value, the count value representing a time signal. The counter may be written, for example by a host processor (not shown), such that the time signal can be set to any desired value. The real time clock comprises a check register that stores a check value. The content of the check register (i.e. the check value) is modified each time a write operation is performed on the counter. For example, the content of the check register can be updated by a control signal each time a write operation is performed on the counter. The check value stored in the check register is used for determining whether a write operation performed on the counter is an authorized write operation or an unauthorized write operation. The check value may be incremented each time a write operation is performed, replaced with a new random number each time a write operation is performed, or a combination of both.

32 Claims, 5 Drawing Sheets

REAL TIME CLOCK

BACKGROUND OF THE INVENTION

1. Field of the Invention

The invention relates to a real time clock, and to a method of detecting unauthorized use of a real time clock. In particular, the invention relates to a secure real time clock, and to a method of enabling unauthorized write operations performed on a real time clock to be detected.

2. Description of the Related Art

A real time clock (RTC) is implemented in nearly every electronic device manufactured today to allow a continuous record of the time to be kept at all times as long as power is applied to a device. The RTC must continuously be updated at all times, including times when parts of the host system, e.g. a host processor, are not powered, that is to say times when the RTC is supplied from a backup battery rather than the main supply or battery.

A RTC can be operated in a number of different ways. For example, one method of operating a RTC is to represent a specific moment in time with a corresponding specific RTC value.

FIG. 1 shows an implementation of a conventional real time clock apparatus 1. The real time clock apparatus 1 comprises a counter 3 which stores a count value that represents a time signal, the count value being continuously updated by a clock signal 5. For example, the counter 3 may be configured to be clocked at 1 second intervals (i.e. 1 Hz) by the clock signal 5, such that the counter 3 represents a counter that counts in "seconds".

The real time clock apparatus 1 of FIG. 1 may be used in conjunction with a host system which is configured such that a specific moment in time, for example, 1 Jan. 1970, 0:00:00 am can correspond to a RTC value of 00000000 h.

In the example shown in FIG. 1, the counter 3 is illustrated as being a 32-bit counter that is represented in a register map 7 by first and second registers 9, 11 (the most-significant-word of the counter 3 being stored in the first register 9 and the least-significant-word of the counter 3 being stored in the second register 11, each register comprising 16 bits).

Many devices also include an alarm and/or calendar function. In the example described above whereby the software of the host system maps each value of the RTC counter to a specific moment in time, e.g. 1 Jan. 1970, 0:00:00 am corresponding to a RTC value of 00000000 h, an alarm or calendar event corresponds to a well specified RTC value which can easily be calculated by software in the host system. It is therefore desirable to be able to write to the RTC to allow legitimate setting of the RTC to the current time (for example when crossing different time zones), and also to allow easy setting of alarms or calendar events. It is also desirable to allow easy setting of wake-up events without extensive translation.

Although it is desirable to enable the RTC to be programmed or written to for the reasons mentioned above, there are other applications in which having a programmable RTC may cause problems. For example, in applications involving digital rights management (for example when a movie or music track is rented for a limited period of time), it is important that any malicious modifications to the RTC must be either prevented or detected.

It is impossible for the RTC itself to differentiate between a malicious (i.e. unauthorized) and a legitimate source. There are two aspects of modification by malicious sources. The first is hardware modification in view of the fact that the RTC is usually contained in a device which is external to the application processor, and is accessed via a serial interface such as SPI or I²C. In this case, it is possible that a hacker can access the serial interface bus and modify the RTC.

The second is software modification, whereby software can be used to access the RTC via the host processor without the knowledge of the legitimate system software on the host processor.

In both cases, the RTC cannot determine the difference between the unauthorized and the legitimate modification processes.

It is an aim of the present invention to provide a secure real time clock, and to enable unauthorized write operations on a real time clock to be detected.

SUMMARY OF THE INVENTION

According to a first aspect of the invention, there is provided a real time clock apparatus for use with a legitimate source. The real time clock apparatus comprises a counter for storing a count value representing a time signal; and a check register for storing a check value, wherein the check value is used for determining whether a write operation performed on the counter is an authorized write operation.

According to another aspect of the invention, there is provided a method of detecting an unauthorized write operation on a real time clock, the real time clock comprising a counter for storing a count value representing a time signal, wherein the counter can be written to set the time signal. The method comprises the steps of storing a check value in a check register, wherein the check value is used for determining whether a write operation performed on the counter is an authorized write operation.

BRIEF DESCRIPTION OF THE DRAWINGS

For a better understanding of the invention, and to show more clearly how it may be carried into effect, reference will now be made, by way of example only, to the accompanying drawings in which.

DETAILED DESCRIPTION OF THE PREFERRED EMBODIMENT

Figure 1:
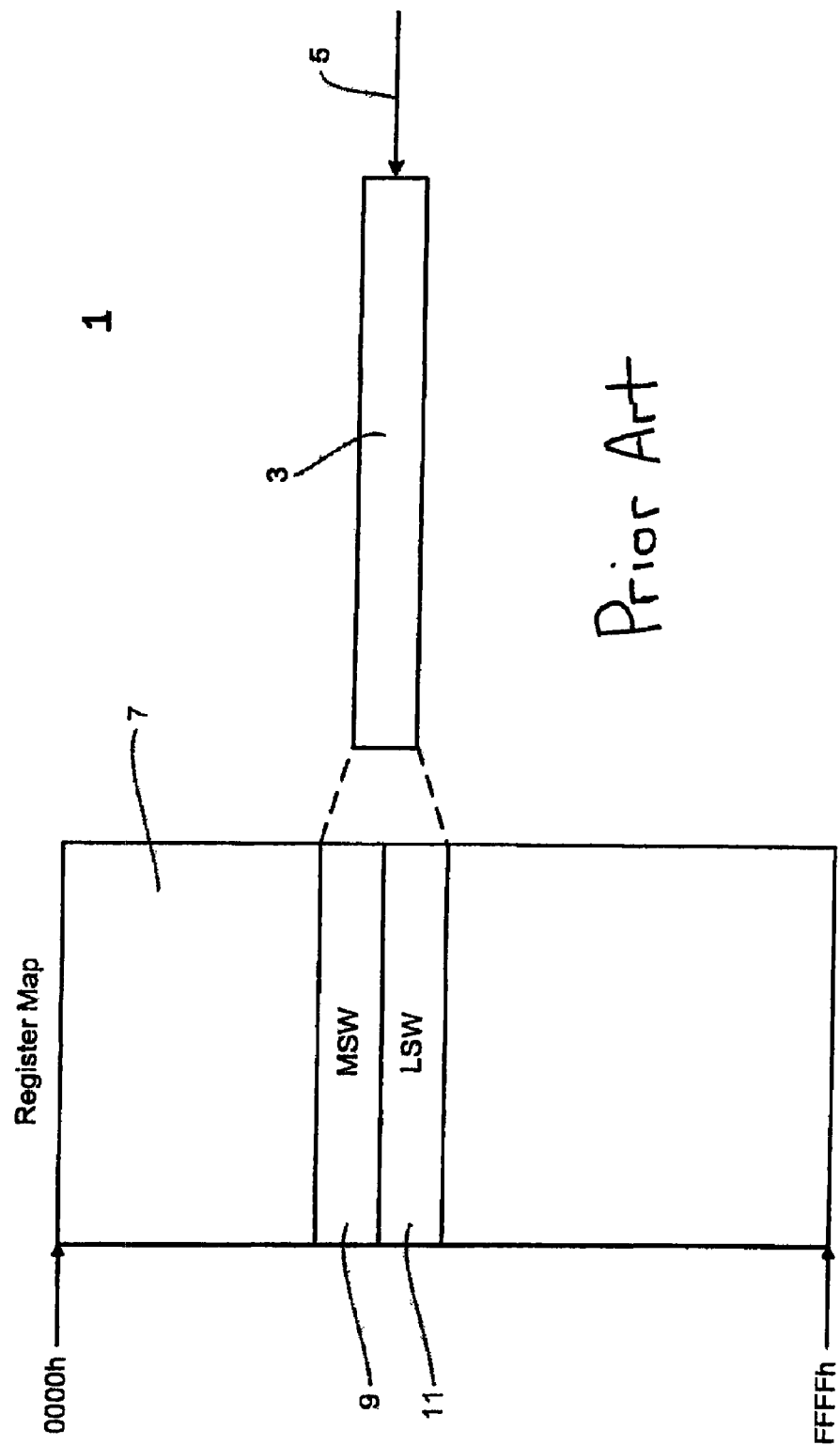
FIG. 1 shows a real time clock apparatus according to the prior art.

As mentioned above in relation to FIG. 1, it is difficult to detect a malicious or unauthorized modification of the RTC. The present invention relates to a real time clock apparatus that produces a secure RTC implementation, which can be used to detect modification of the RTC by unauthorized processes, and in particular an unauthorized write operation on the RTC.

Figure 2:
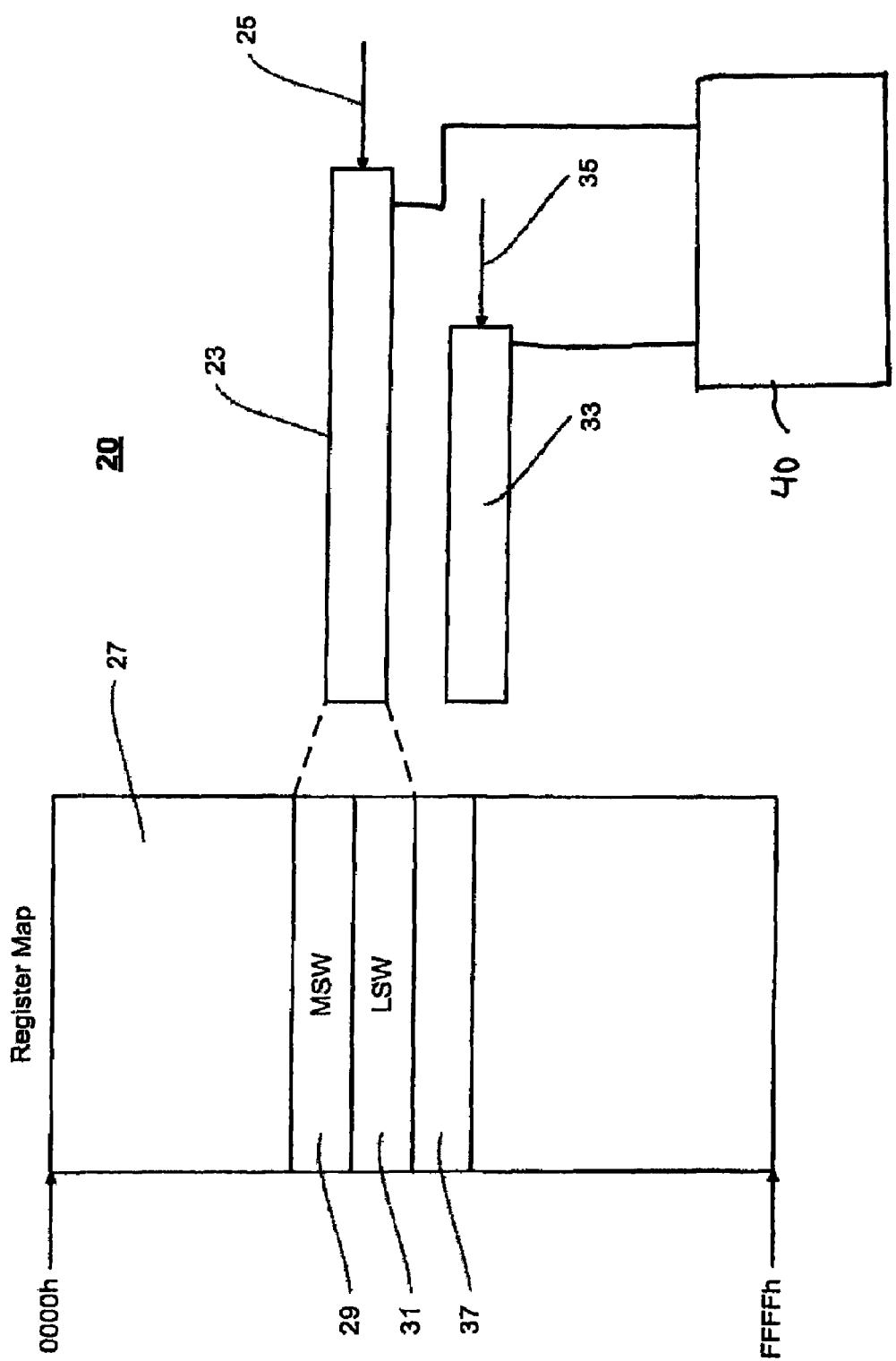
FIG. 2 shows a real time clock apparatus according to an embodiment of the present invention.

FIG. 2 shows a real time clock apparatus 20 according to a first embodiment of the present invention. The real time clock apparatus 20 comprises a counter 23 which stores a count value, the count value representing a time signal. It will be appreciated that the term "time signal" encompasses any format for representing time. For example, these include, but are not limited to, the time signal representing the number of clocks that have occurred in a certain time, a real moment in time (for example linked to a given reference such as 1 Jan. 1970, 0:00:00 am represented by a RTC value of 00000000 h), or the time that has elapsed since a given starting point. The count value stored in the counter is updated at regular intervals while powered, for example at one second intervals (i.e. 1 Hz), by a clock signal 25. The clock signal 25 may be derived, for example, using an oscillator circuit (not shown) configured to generate an oscillating signal having a frequency of 32.768 kHz, which is passed through a divider circuit (not shown) to generate a 1 Hz clock signal 25 for the counter 23. It will be appreciated that the count value stored in the counter 23 can be updated at intervals other than one second intervals, and that the clock signal 25 may be generated or derived in other ways that will be familiar to a person skilled in the art.

The counter 23 may be implemented as a 32-bit counter, and represented in a register map 27 using first and second registers 29, 31 (the most-significant-word of the counter 23 being stored in the first register 29, for example, and the least-significant-word of the counter 23 being stored in the second register 31, the first and second registers 29, 31 each being 16-bit words). As such, a 32-bit counter clocked at one second intervals is capable of accumulating approximately 136 years of seconds before the counter rolls over. The time/date may therefore be represented by the number of seconds since a reference point. For example, as mentioned above, a reference time/date of 1 Jan. 1970, 0:00:00 am may be represented as a RTC value of 00000000 h.

It is noted that the invention is not restricted to having a 32-bit counter 23, or being represented as two separate registers 29, 31. For example, the counter 23 may comprise any number of bits, and may be represented using just one register or more than two registers, depending on the system architecture and the length of time that is to be covered.

The counter 23 may, for example, be written by a host processor 40, such that the time signal can be set to any desired value. This may involve the use of a read/write buffer (not shown) that enables the count value stored in the counter 23 to be read or written without affecting the continuous clocking of the counter 23.

According to the invention the real time clock apparatus 20 comprises a check register 33 that stores a check value. The content of the check register 33 (i.e. the check value) is modified each time a write operation is performed on the counter 23. In other words, the check value is updated if there is an update to the counter 23 by some means other than the clock signal 25. For example, the content of the check register 33 can be updated by a control signal 35 each time a write operation is performed on the counter 23. In the embodiment of FIG. 2, a write operation performed on the counter 23 may involve a write operation being performed on either the first register 29 or the second register 31 of the register map 27, or both the first and second registers 29, 31. Furthermore, in an embodiment where a read/write buffer is provided for writing the counter 23, the write operation may involve a write operation to said read/write buffer. As such, the invention is intended to embrace any write operation to any part of the real time clock apparatus being a trigger for updating the check register 33 via the control signal 35.

The control signal 35 is preferably hard-wired such that the control signal 35 is automatically generated each time a write operation is performed on the counter 23. Alternatively, the control signal 35 may be generated under software control, but using suitable security provisions such that the generation of the control signal 35 cannot be altered or stopped by an unauthorized user or process.

The check value stored in the check register 33 is used for determining whether a write operation performed on the counter 23 is an authorized write operation or an unauthorized write operation. In particular, the check value stored in the check register 33 is used for determining whether the last write operation performed on the counter 23 was an authorized write operation or an unauthorized write operation from a legitimate source.

The check register 33 may be represented as a single word 37 in the register map 27, for example a 16-bit word. It will be appreciated that the invention is equally applicable with other implementations of the check register 33, and having a different number of bits.

According to one embodiment, the check value stored in the check register 33 is incremented each time a write operation is performed on the counter 23. For example the check value can be incremented by one each time a write operation is performed on the counter 23. In this embodiment the check register 33 is effectively a write counter that counts the number of write operations performed on the counter 23, which is clocked by the control signal 35. As mentioned above, the number of write operations performed on the counter 23 may actually comprise the number of write operations performed on one of the registers 29, 31, or both, or the number of write operations performed on a read/write buffer (not shown). Furthermore, the control signal 35 may be generated internally or by "secure" software, as mentioned above. A legitimate source, such as a host processor, is therefore able to compare the check value stored in the check register 33 with an "authorized" value, for example its own record of how many write operations have been performed on the counter 23. Any discrepancy between the check value stored in the check register 33 and the record held by the host processor is an indication that an unauthorized write operation has been performed on the counter 23.

The check register 33 is preferably configured as a read-only register such that the check value stored in the check register 33 cannot be tampered or altered by an unauthorized user. In other words, the check register 33 can only be written in an automatic or secure manner in response to a write operation being performed on the counter 23, and cannot be written by any other means.

In order to prevent malicious overflow of the check register 33 by multiple write operations being performed on the counter 23 by an unauthorized user, i.e. hence allowing the check register 33 to be reset, i.e. rolled over, to its previous value following a malicious write operation, the real time clock apparatus may be configured such that the total number of write operations is restricted to be less than a predetermined number (for example a low number) in any given period. For example, the real time clock may be configured such that the number of write operations cannot exceed eight operations per hour. It will be appreciated that other rates of write operations are intended to fall within the scope of the invention, and may be chosen according to the size of the check register 33, or the likely number of authorized write operations that may need to be performed in a given period. It is also noted that, in certain embodiments, the check register 33 can be configured such that it does not overflow at all once it has reached its maximum value, hence preventing the check register 33 from being reset to its previous value by malicious overflow.

According to another aspect of the invention, the check register may be initialized to a random number (i.e. rather than to zero) following a power-up reset, in order to cover the situation where an unauthorized user could remove the supply from the real time clock only and not from the host system in order to reset the check register 33.

According to another embodiment of the invention, the check value stored in the check register 33 is a random number that is updated to a new random number each time a write operation is performed on the counter 23. With this implementation it is more difficult to make malicious write operations appear legitimate, since after every write operation the new check value is unrelated to the previous check value. In order to bring the check register 33 to its previous value a malicious process would have to write to the counter 23 and read the check register 33 to find the check value, and repeat this process until such time as the check register has the same check value as originally read.

In this embodiment a host processor can read the random check value after each write operation has been performed, such that the host processor has a record of the random check value assigned after its previous write operation. This record can then be used to check if any unauthorized write operations have been performed since the previous legitimate write operation by the host processor.

According to another aspect of the invention, the check register 33 may comprise a first check value portion that is configured to be incremented, and a second check value portion that is configured to contain a new random number each time a write operation is performed on the counter 23. In other words, one part of the check register 33 is incremented with every write access, whereas the other part is provided with a new random value.

According to an alternative embodiment, the first and second portions may each be configured to be incremented. According to yet another alternative, the first and second portions may each be configured to contain random numbers. It will be appreciated that the first and second check value portions may comprise an equal number of bits, or comprise a different number of bits depending on the particular application. The check value may also comprise more that two portions.

It will be appreciated that, regardless of which of the above described embodiments is used to implement the check register, the detection of an unauthorized write operation is based on using the check value stored in the check register 33, which is automatically updated after every write operation to the counter 23, to determine whether an unauthorized write operation has been performed. This involves comparing the check value of the read-only check register 33 with the value that it had after the last legitimate write access. If the value is different, then the last write operation performed on the counter 23 was from an unauthorized source.

Preferably, the host system stores the last valid value of the read-only check register 33 in non-volatile memory in a region with access for authorized processes only, for example in processes such as ARM's TrustZone™ or any other equivalent technology.

It is noted that, in the embodiments described above, there are numerous configurations relating to the physical relationship of the counter 23 and the check register 33. For example, the check register 33 may be implemented as part of the same device or package as the counter 23 (for example in applications where the real time clock counter is provided as a stand alone packaged device). Alternatively, the check register 33 may be provided separately from the counter 23.

Figure 3:
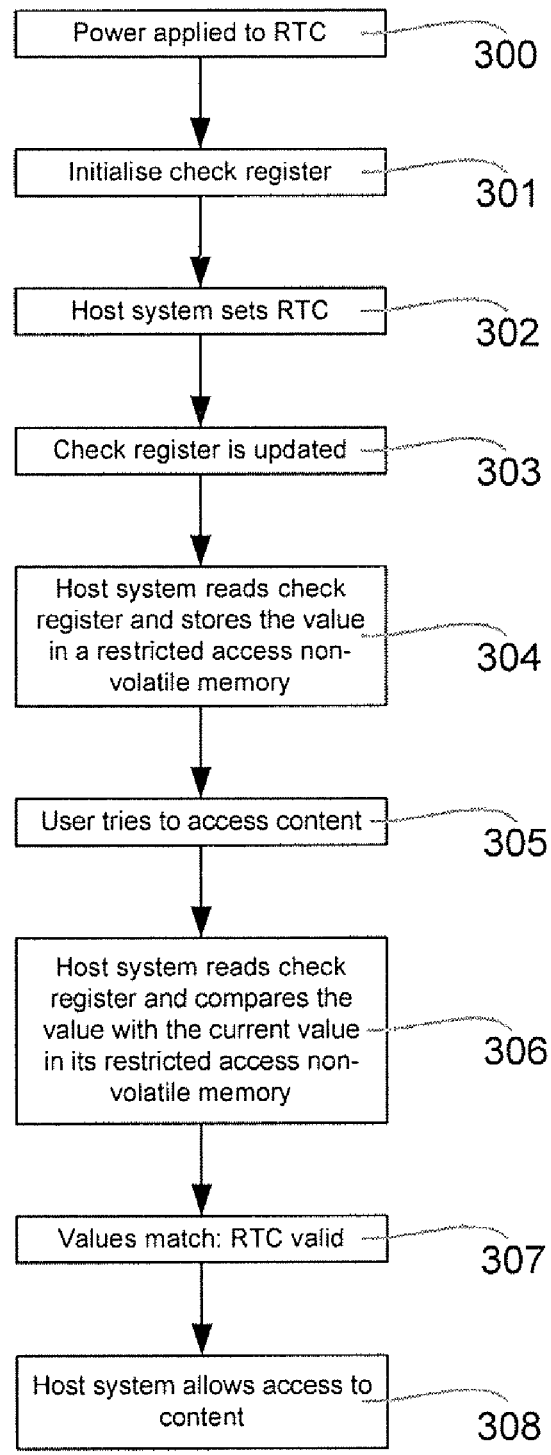
FIG. 3 is a flow chart illustrating an authorized real time clock access procedure.

FIG. 3 is a flow chart illustrating a legitimate or authorized RTC access procedure.

In step 300 power is applied to the RTC, and the check register 33 is then initialized in step 301.

In step 302 the host system sets the RTC, i.e. performs a write operation on the counter 23. The write operation on the counter 23 results in the check register 33 being updated with a new check value, step 303. The host system reads the new check value in step 304, and stores the value in a secure location, for example a restricted access non-volatile memory.

In response to a user performing a process having a real time clock element, for example attempting to access the content of a data download having a limited use period, step 305, the host system then reads the check register, step 306, and compares the check value with the current value (i.e. authorized value) stored in its restricted access non-volatile memory.

If the values match, step 307, the host system allows access to the content, step 308.

It will be appreciated that, in the embodiment where the updating of the check value involves incrementing the check value following a write operation to the counter 23, the host system does not necessarily have to read the check register after a write operation, but may instead increment its own stored value on the basis that this will implicitly match the new value in the check register.

It will also be appreciated that certain steps in the flow chart of FIG. 3 may be performed in a different order. For example, the check register 33 may be initialized after step 302, rather than prior to step 302.

Figure 4:
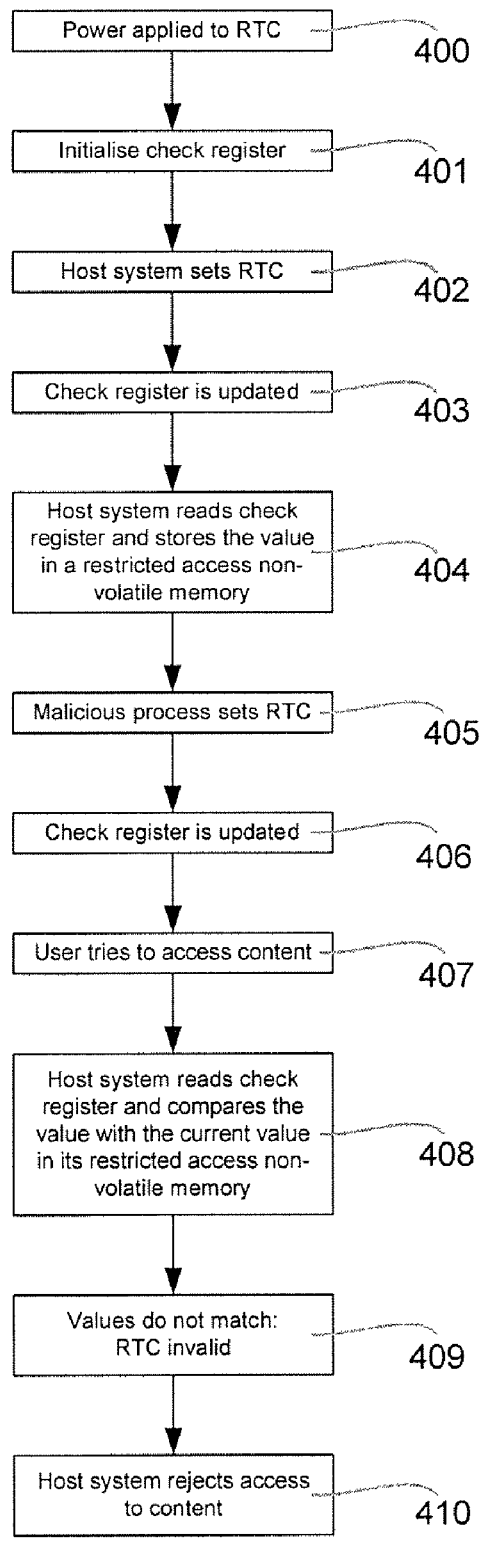
FIG. 4 is a flow chart illustrating an unauthorized real time clock access procedure.

FIG. 4 is a flow chart illustrating a malicious or unauthorized RTC access procedure In step 400 power is applied to the RTC, and the check register 33 is then initialized in step 401.

In step 402 the host system sets the RTC, i.e. performs a write operation on the counter 23. The write operation on the counter 23 results in the check register 33 being updated with a new check value, step 403. The host system reads the new check value in step 404, and stores the value in a secure location, for example a restricted access non-volatile memory.

Step 405 shows a malicious or unauthorized write operation being performed on the RTC, which results in the check register being updated in step 406.

Thereafter, in response to a user attempting to access content, step 407, the host system then reads the check register, step 408, and compares the check value with the current value (i.e. authorized value) stored in its restricted access non-volatile memory.

In this scenario the values do not match in step 409 in view of the fact that the check register has been updated following the write operation performed on the RTC by the unauthorized user. As a result the host system rejects access to the content, step 410.

It will also be appreciated that certain steps in the flow chart of FIG. 4 may be performed in a different order. For example, the check register 33 may be initialized after step 402, rather than prior to step 402.

It will be appreciated that the real time clock apparatus according to the present invention can be used in numerous other applications, in addition to the examples provided above.

Figure 5:
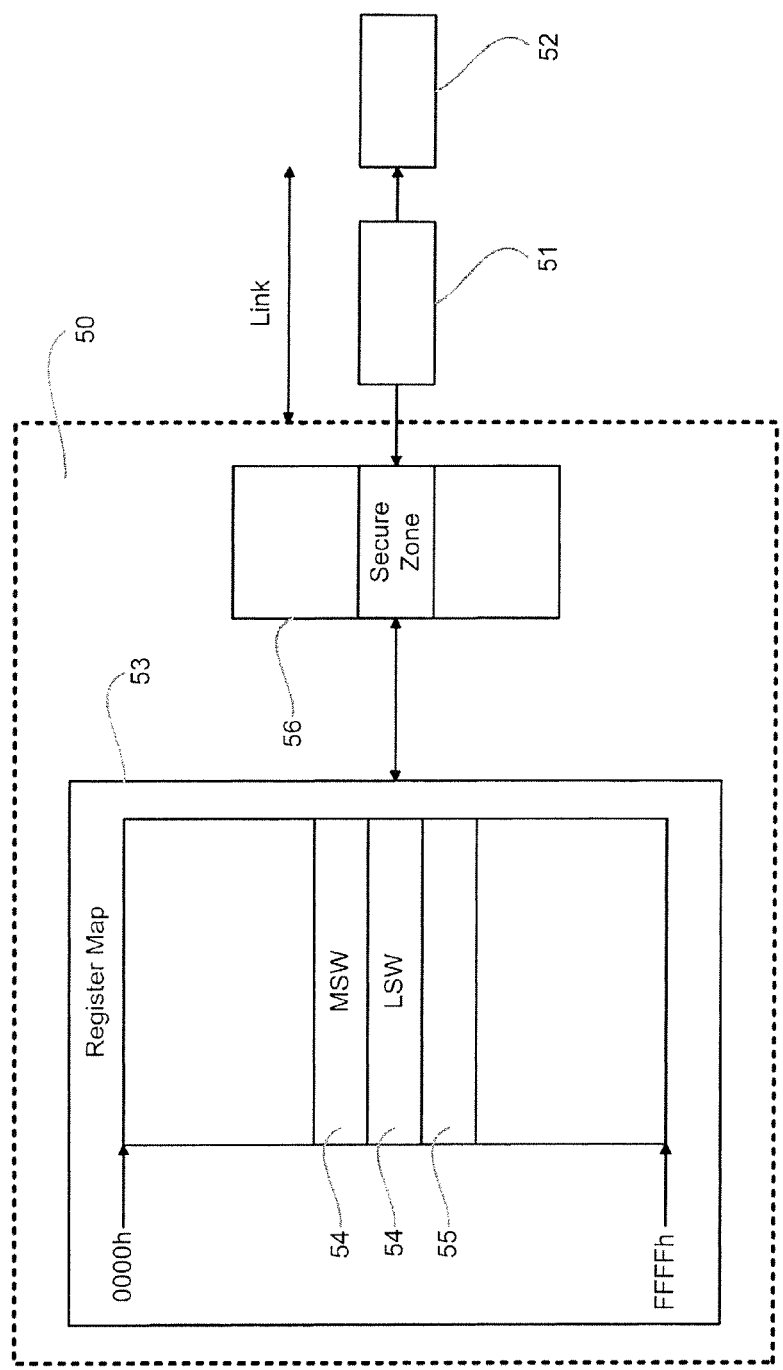
FIG. 5 shows how the real time clock apparatus may be used with digital rights management applications.

FIG. 5 is a block diagram illustrating a system in accordance with the present invention. The dotted line represents a typical application 50, with digital data 51 being downloaded from a content provider 52.

A real time clock apparatus 53 comprises a counter 54 and a check register 55, as described in the embodiments above.

Within a host device 56, for example an applications processor 56 or another device, there is contained software that interfaces with the real time clock 53 and the clock management software of the applications processor 56, such that the applications processor 56 can decide what action to take in the event of the detection of a discrepancy, i.e. an unauthorized write operation. For example, the applications processor 56 may be configured to delete the downloaded data 51, lock the user from using the software, and/or alert the content provider that there has been malicious behavior.

Preferably the digital download 51 contains information that acts as a switch or an actuator, for triggering the software in the secure zone so as to enable the real time clock detection scheme.

Preferably, the applications processor 56 is able to provide an indication to the content provider 52 that it has the ability to perform the detection scheme, thus enabling the content provider 52 to place the appropriate switch or trigger in the downloaded data. In this manner the content provider 52 is able to make an informed decision regarding whether or not the applications processor can be trusted, i.e. depending upon whether or not the applications processor has the real time clock apparatus according to the present invention.

The switch or actuator contained in the data download 51 enables the check register of the secure real time clock to be selectively enabled. For example, the secure real time clock may be selectively enabled in an embodiment where the control signal 35 is generated by "secure" software as mentioned above. The data download 51 may also include a time-tag. This enables the check register to be used in applications where the data downloaded from a remote device or location is only permitted to be used for a specified period, for example specified by the time-tag. Examples include "try-before-you-buy" software packages, music or video movies.

The invention can be used in any application requiring a real time clock including, but not limited to, applications wherein the data download includes such items as movies for rental, games for rental, satellite navigation information for rental, software applications, and so on, (whereby each download is used for a limited period).

The invention described above has the advantage of providing a secure RTC implementation which can be written, and which can also detect and report tampering without being cleared or reset by a malicious process.

The invention avoids the use of encryption and data security between the counter and the host device, and is very simple to implement. Any process can read the RTC registers, but by analyzing the register data presented, the legitimate process can determine whether it was the last process to write to the RTC.

In the embodiments described above it will be appreciated that references to performing a write operation on the first register 23 may involve performing a write operation to the entire counter (i.e. formed from a number of separate registers), or to any of the individual registers forming the overall counter.

Although the preferred embodiments have been described as incrementing the check register, it will be appreciated that the invention is equally applicable to an arrangement whereby the check register is decremented.

It is noted that the invention may be used in a number of applications. These include, but are not limited to, consumer applications, medical applications, industrial applications and automotive applications. For example, typical consumer applications include laptops, mobile phones, PDAs and personal computers.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

What is claimed is:

1. A real time clock apparatus for use with a legitimate source, the real time clock apparatus comprising:
    a counter for storing a count value representing a time signal;
    a check register for storing a check value, wherein the check value is used for determining whether a write operation performed on the counter is an authorised write operation; and
    means for comparing the check value stored in the check register with an authorised value, and means for determining if an unauthorised write operation has been performed on the counter if the check value does not match the authorised value.

2. A real time clock apparatus as claimed in claim 1, further comprising updating means for automatically updating the check value each time a write operation is performed on the counter.

3. A real time clock apparatus as claimed in claim 2, wherein the updating means is configured to increment the check value stored in the check register each time a write operation is performed on the counter.

4. A real time clock apparatus as claimed in claim 3, wherein the updating means is configured to increment the check value by one each time a write operation is performed on the counter.

5. A real time clock apparatus as claimed in claim 3, further comprising means for limiting the number of write operations performed on the counter in a given period of time.

6. A real time clock apparatus as claimed in claim 3, wherein the check value stored in the check register is initialised to a random number following a power up sequence.

7. A real time clock apparatus as claimed in claim 2, wherein the updating means is configured to update the check value with a new random number each time a write operation is performed on the counter.

8. A real time clock apparatus as claimed in claim 2, wherein the updating means is configured to update a first portion of the check register in an incremental manner, and a second portion of the check register in a random manner, each time a write operation is performed on the counter.

9. A real time clock apparatus as claimed in claim 2, wherein the updating means is implemented in hardware.

10. A real time clock apparatus as claimed in claim 2, wherein the updating means is implemented in software.

11. A real time clock apparatus as claimed in claim 1, wherein the counter comprises a plurality of registers.

12. A real time clock apparatus as claimed in claim 1, wherein the counter is periodically updated at predetermined intervals to represent a real time signal.

13. A real time clock apparatus as claimed in claim 1, further comprising means for selectively enabling or disabling the use of the check register.

14. A real time clock apparatus as claimed in claim 13, wherein the means for selectively enabling or disabling the check register is controlled by a control signal received from a remote source.

15. The real time clock of claim 1, wherein the real time clock apparatus is incorporated into a processor.

16. The real time clock of claim 1, wherein the real time clock is incorporated into an electronic device.

17. The real time clock of claim 1, wherein the real time clock is incorporated into a communications device.

18. The real time clock of claim 1, wherein the real time clock is incorporated into a portable telephone.

19. The real time clock of claim 1, wherein the real time clock is incorporated into an audio device.

20. The real time clock of claim 1, wherein the real time clock is incorporated into a computer device.

21. A method of detecting an unauthorised write operation on a real time clock, the real time clock comprising a counter for storing a count value representing a time signal, wherein the counter can be written to set the time signal, the method comprising the steps of:

storing a check value in a check register, wherein the check value is used for determining whether a write operation performed on the counter is an authorised write operation; and comparing the check value stored in the check register with an authorised value, and determining if an unauthorised write operation has been performed on the counter if the check value does not match the authorised value.

22. A method as claimed in claim 21, further comprising the steps of automatically updating the check value each time a write operation is performed on the counter.

23. A method as claimed in claim 22, wherein the updating step comprises the step of incrementing the check value each time a write operation is performed on the counter.

24. A method as claimed in claim 23, wherein the updating step comprises the step of incrementing the check register by one each time a write operation is performed on the counter.

25. A method as claimed in claim 23, further comprising the step of initialising the check value of the check register to a random number following a power up sequence.

26. A method as claimed in claim 22, further comprising the step of updating the check value with a new random number each time a write operation is performed on the counter.

27. A method as claimed in claim 22, wherein the updating step comprises the step of updating the check value with a new random number each time a write operation is performed on the counter.

28. A method as claimed in claim 22, wherein the updating step comprises the steps of updating a first portion of the check register in an incremental manner, and a second portion of the check register in a random manner, each time a write operation is performed on the counter.

29. A method as claimed in claim 21, wherein the counter comprises a plurality of registers.

30. A method as claimed in claim 21, wherein the counter is periodically updated at predetermined intervals to represent a real time signal.

31. A method as claimed in claim 21, further comprising the step of selectively enabling or disabling the use of the check register.

32. A method as claimed in claim 31, wherein the step of selectively enabling or disabling the check register is controlled by a control signal received from a remote source.

* * * * *